United States Patent [19]

Kikuta

[11] Patent Number: 5,419,855
[45] Date of Patent: May 30, 1995

[54] FAR-INFRARED RADIATOR

[75] Inventor: Shunichi Kikuta, Tokyo, Japan

[73] Assignee: Fukutani Co., Ltd., Nagoya, Japan

[21] Appl. No.: 99,328

[22] Filed: Jul. 30, 1993

[30] Foreign Application Priority Data

Aug. 31, 1992 [JP] Japan ................... 4-231920

[51] Int. Cl.$^6$ .............................. F21V 9/04
[52] U.S. Cl. ...................... 252/587; 392/407
[58] Field of Search .......... 252/582, 587, 588; 359/350, 357; 392/407; 501/38, 40, 41

[56] References Cited

U.S. PATENT DOCUMENTS

| | | | |
|---|---|---|---|
| 2,986,527 | 5/1961 | Redfield et al. | 252/587 |
| 2,997,590 | 8/1961 | Lyons et al. | 252/587 |
| 3,981,818 | 9/1976 | Swinehart et al. | 252/587 |
| 4,965,434 | 10/1990 | Nomura et al. | 252/587 |
| 5,007,689 | 4/1991 | Kelly et al. | 252/587 |
| 5,234,985 | 8/1993 | Koo et al. | 252/587 |

FOREIGN PATENT DOCUMENTS

| | | |
|---|---|---|
| 0302141 | 2/1989 | European Pat. Off. |
| 0387356 | 9/1990 | European Pat. Off. |
| 0433097 | 6/1991 | European Pat. Off. |

OTHER PUBLICATIONS

Database WPI, Week 9204, Derwent Publications Ltd., London, GB; AN 92-27500 & JP-A-3 273 076 (Showa) 4 Dec. 1991.

Database WPI, Week 8535, Derwent Publications Ltd., London, GB; AN 85-212688 & JP-A-60 134 126 (Matsushita) 23 Dec. 1983.

*Primary Examiner*—Philip Tucker
*Attorney, Agent, or Firm*—Nikaido, Marmelstein, Murray & Oram

[57] ABSTRACT

A novel far-infrared radiating material is provided, which can effectively radiate thermal energy necessary for exciting water molecules contained in animals and plants, for example in human body. A far-infrared radiating material comprises 5–60 wt. % of alumina, 20–70 wt. % of at least one titanium compound selected from titanium dioxide, titanium carbide and titanium boride, 20–50 wt. % of at least one zirconium compound selected from zirconia, zirconium carbide and zirconium boride, and 0.01–0.5 wt. % of a rare earth oxide. A far-infrared radiating composition comprises the material and a resin, which may be formed in the form of plate, tube, sheet, or fiber.

10 Claims, No Drawings

FAR-INFRARED RADIATOR

BACKGROUND OF THE INVENTION

1. Field of the Invention

The present invention relates to a novel far-infrared radiator. More particularly, the invention relates to a far-infrared radiating material, which may be used in the fields of processing such as drying and refrigeration of various materials, for example of food, raising of agricultural and marine products, addition of function to medical instruments or clothing, such as heat insulation, air conditioning, hairdressing and cosmetic treatment, and so on.

2. Description of the Related Art

There are various ceramics containing alumina, titania, zirconia, silica, or the like conventionally proposed as a far-infrared radiating material, which are employed in heating, cooling, or drying of articles, in air conditioning, or in medical applications to enhance absorption or radiation efficiency of thermal energy.

In order to efficiently apply thermal energy to an article or a human body by the use of far-infrared rays, it is necessary to efficiently radiate far-infrared rays coincident with rotation-vibration wavelengths of water molecules contained in an object to which far-infrared rays are applied. The conventional far-infrared radiating materials, however, do not always have a satisfactory radiation efficiency of far-infrared rays suitable for excitation of water molecules.

SUMMARY OF THE INVENTION

It is, therefore, an object of the present invention to provide a novel far-infrared radiating material which can efficiently radiate the thermal energy necessary for excitation of water molecules contained in animals and plants, for example in a human body.

A far-infrared radiating material according to the present invention, which can achieve the object, comprises 5–60 wt. % (% by weight) of alumina, 20–70 wt. % of at least one titanium compound selected from titanium dioxide, titanium carbide and titanium boride, 20–50 wt. % of at least one zirconium compound selected from zirconia, zirconium carbide and zirconium boride, and 0.01–0.5 wt. % of a rare earth oxide.

DETAILED DESCRIPTION OF THE INVENTION

The content of alumina contained in the far-infrared radiating material of the present invention ranges from 5 to 60% by weight. With a content above 60 wt. % the radiation efficiency would decrease in the wavelength range of 8–10 $\mu$m or thereabove, while with a content below 5 wt. % the radiation efficiency would be acceptable but mixing with a polymer binder would become difficult to form blends, which would be also unfavorable for fabrication. The content of the titanium compound is between 20 and 70 wt. %. With a content above 70 wt. % the radiation efficiency would decrease in the wavelength range of above 12 $\mu$m, while with a content below 20 wt. % the radiation efficiency would be acceptable but the mixing operation encounters difficulties in blending with a polymer binder, which would result in the degradation of its kneading workability.

The content of the zirconium compound ranges from 20 to 50 wt. %. With a content above 50 wt. % the radiation efficiency would decrease, while with a content below 20 wt. % the radiation efficiency would unfavorably decrease in the wavelength range of not more than 5 $\mu$m. It is preferable that the sum of the contents of the titanium compound and the zirconium compound be not less than 70 wt. %. Further, the rare earth oxide shows an effect mainly in improvement of far-infrared radiation efficiency if it is formulated in amount of not less than 0.01 wt. %. However, it is not economically practical to formulate the rare earth oxide in a great amount that is not greater than 0.5 wt. %.

As described, the far-infrared radiating material of the present invention comprises alumina, a titanium compound such as titanium dioxide, titanium carbide, and titanium boride, a zirconium compound such as zirconia, zirconium carbide, and zirconium boride, and an oxide of rare earth element such as neodymium, lanthanum and yttrium. The far-infrared radiating material of the invention may contain without any serious problem an additional component in amount of not more than 8 wt. %, for example a small amount of silica, an alkali metal oxide, an alkaline earth oxide, an VIII-group metal oxide, or a phosphorus compound. Such an additional component may be contained not only in the form of a sole oxide but also in the form of composite oxide.

The components contained in the far-infrared radiating material of the present invention may be in the form of powders, which are mixed to form a composition. Alternatively, some or all of the components may be formulated and then sintered at high temperature, and the resulting product may be then ground. The grain size of far-infrared radiating material thus obtained should preferably be as fine as possible in respect of mixing operability or moldability in various processing operations as described below.

The far-infrared radiating material of the present invention may be combined with a binder of resin material such as a synthetic resin, which combination may be formed in various forms, for example in the form of film, plate, tube or the like. The material may also be used as far-infrared radiating fibers by incorporating it with a polymer which is suitable for fiber formation and spinning the mixture. The material may be further used as a far-infrared radiating sheet by mixing it in a sheet-making operation for example making of paper. Such a sheet or plate may be further subjected to post-forming to form a molded body in arbitrary shapes. In addition the material may be blended with a suitable binder or solvent for application as a far-infrared radiating coating.

Water in living organism is normally associated with a biopolymer to form hydration clusters, which is capable of absorbing far-infrared rays with wavelength of about 6–12 $\mu$m. The far-infrared radiating material of the present invention can efficiently radiate far-infrared rays in a wide wavelength range of 4–20 $\mu$m or more, and therefore may be utilized in an apparatus for efficiently heating or drying a food from an animal or a plant. Further, the material can be applied in medical instruments as well as in clothing or in building materials, revealing its superior property as compared to the conventional materials.

EXAMPLES AND COMPARATIVE EXAMPLES

The following powder components were respectively mixed in the formulations as shown in Table 1 to obtain far-infrared radiating materials A–G according to the 20 present invention and far-infrared radiating materials H–M of comparative examples: titanium dioxide powder (grain size: 0.1–0.3 μm); titanium carbide powder (grain size: about 0.3 μm); titanium boride powder (grain size: about 0.3 μm); alumina powder (grain size: 0.3–0.5 μm); zirconia powder (grain size: about 0.3 μm); zirconium carbide powder (grain size: about 0.3 μm); zirconium boride powder (grain size: about 0.3 μm); lanthanum oxide powder (grain size: about 0.3 μm); yttrium oxide powder (grain size: about 0.3 μm); neodymium oxide powder (grain size: about 0.3 μm); and boron dioxide powder (grain size: about 0.3 μm).

50 weight parts of each far-infrared radiating material thus obtained was formulated with 100 weight parts of high-density polyethylene, and kneaded at resin temperature of 200 ° C. for ten minutes at a rotational frequency of 150 rpm in a kneading and extruding machine manufactured by TOYO TESTER Co., Ltd. to obtain pellets thereof. A sheet was made from the pellets of each composition by an extruder, and a plate of thickness of 0.8 mm was formed therefrom by thermal press. Test pieces each of 5 cm×5 cm were cut out from the respective plates thus obtained, and the infrared radiance thereof was measured at temperature of 35 ° C. by a far-infrared radiation spectrometer (JIR-E500 manufactured by JEOL Ltd. (Nihon Denshi)). A radiation efficiency R was calculated with each measurement value of radiance in wavelength range of 4–24 μm as a ratio thereof to the ideal radiance of a black body at a temperature of 35 ° C.

Table 1 also includes values of radiation efficiency R obtained for the respective test pieces.

TABLE 1

| material | A | B | C | D | E | F | G | H* | I* | J* | K* | L* | M* |
|---|---|---|---|---|---|---|---|---|---|---|---|---|---|
| Formulations (in weight parts) and far-infrared radiation efficiencies R (in %) of far-infrared radiating materials | | | | | | | | | | | | | |
| $TiO_2$ | 30 | 40 | 50 | 40 | 20 | 20 | 60 | 62 | 15 | 75 | 30 | 40 | — |
| TiC | — | — | — | — | 20 | — | — | — | — | — | — | — | — |
| TiB | — | — | — | — | — | 10 | — | — | — | — | — | — | — |
| $Al_2O_3$ | 40 | 40 | 5 | 40 | 40 | 50 | 10 | 3 | 70 | 15 | 20 | 40 | 47 |
| $ZrO_2$ | 30 | 20 | 40 | — | 20 | 20 | 25 | 35 | 15 | 5 | 50 | 20 | — |
| ZrC | — | — | 5 | — | — | — | — | — | — | — | — | — | — |
| ZrB | — | — | — | 20 | — | — | — | — | — | — | — | — | — |
| $La_2O_3$ | 0.2 | 0.2 | 0.2 | 0.2 | 0.2 | 0.2 | 0.2 | 0.2 | 0.2 | 0.2 | 0.2 | — | — |
| $Y_2O_3$ | — | 0.1 | — | — | — | — | — | — | — | — | — | — | — |
| $Nd_2O_3$ | 0.2 | 0.1 | 0.2 | 0.2 | 0.2 | 0.2 | 0.2 | 0.2 | 0.2 | 0.2 | 0.2 | — | — |
| $SiO_2$ | — | — | — | — | — | 5 | — | — | — | — | — | — | 53 |
| R | 92.2 | 92.0 | 94.0 | 91.3 | 93.4 | 92.4 | 92.1 | 80.1 | 82.1 | 79.3 | 78.6 | 86.1 | 65.2 |

*comparative examples

TEST EXAMPLE 1

Far-infrared radiating resin plates P of 900 mm×900 mm×0.8 mm were made in the same manner as above in formulation of 10 weight parts of the far-infrared radiating material B of the present invention to 100 weight parts of polypropylene, with which all side wall surfaces and ceiling surface of a drying chamber of width of 8 m, depth of 8 m, and height of 1.8 m were plastered except over portions where an inlet grille and an outlet grille of warm air were arranged to face each other on the left and right side walls. Four stainless steel moving racks each having seven step screen shelves on which scallop adductor muscles were placed were put in the drying chamber as so internally modified, and dried in flow of warm air at 24 ° C. at wind velocity of about 5 m/min. After four hour drying, uniformly semi-dried adductor muscles were obtained.

Temperature measurements were conducted by a thermocouple on a surface of and inside adductor muscles one of which was placed at a position of 1 m away from the central portion of inlet grille in the middle step of moving rack and the other of which was placed at a position of 1 m away from the outlet grille in the middle step. The same temperature was recorded at 24 ° C. for all measuring points after 48 minutes from the start of drying, as shown in Table 2.

Similarly, resin plates Q were made in the same manner as above using Comparative Example J of far-infrared radiating material, with which the side wall surfaces and the ceiling surface of drying chamber were plastered in the same manner as above. In the drying chamber a similar drying test of scallop adductor muscles was carried out. Four hour drying could not uniformly dry the adductor muscles, and additional one hour drying was required to make all the adductor muscles semi-dried.

Table 2 also shows results of temperature measurements by the thermocouples after 48 minutes from the start of drying at the same locations of adductor muscles placed at the same positions on the moving rack as above. As seen from Table 2, the comparative far-infrared radiating material has a broad temperature distribution and a low efficiency of drying the object to be dried, as compared with the far-infrared radiating material of the present invention.

TABLE 2

| Temperature distribution in °C. after 48 minutes from start of warm air drying of adductor muscles | | |
|---|---|---|
| Measured Position | With resin plates P of the invention | With resin plates Q of comp. example |
| Adductor muscle on the inlet grille side | | |
| Surface | 24 | 26 |
| Inside | 24 | 24 |
| Adductor muscle on the outlet grille side | | |
| Surface | 24 | 23 |
| Inside | 24 | 22 |

TEST EXAMPLE 2

The far-infrared radiating material A of the present invention was uniformly mixed in a dope suitable for rayon fiber spinning in such a formulation that the material A was contained in amount of 1 wt. % as compared to the rayon solids content. A rayon staple of 4 denier was made from the mixture by spinning, and a rayon non-unwoven fabric was obtained having an a real density of 30 g/m² by the needle punch method. The rayon non-unwoven fabric was then cut into pieces of 25 cm×15 cm, from which tubular peach fruit bags were sewn in length of 15 cm and in diameter of 8 cm.

Another rayon staple containing 1 wt. % of the far-infrared radiating material M of the comparative example was produced in the same manner as above, and peach fruit bags of the comparative example material were made in the same manner as above.

For further comparison, additional peach fruit bags were prepared, which were conventionally used and which were made of glassinc paper.

These bags were put on infant fruits of 8–9 year old peach trees (brand "Noto") selected at random, and the fruits were raised in that state. The raised fruits were gathered at harvest in sections of upper branch, middle branch, and lower branch, and the gathered fruits were evaluated in accordance with the following items of evaluation. Table 3 shows the evaluation results. It is seen that the fruit bags using the far-infrared radiating material of the present invention are effective in production of high quality peach fruits increased in sugar content and well-enlarged.

Evaluated Items (1) Size: Each fruit was measured by slide gauge at harvest in height, length and breadth.

(2) Weight: A weight of each fruit was measured by home use weighing machine at harvest.

(3) Sugar content: A sugar content was measured by refracting saccharimeter with each of two sarcocarps taken on the equator and being symmetric with each other with resect to the suture of fruit at harvest, and an average value of the two sugar contents was calculated.

(4) Color: A color tone of each fruit at harvest was visually evaluated in three grades with points defined as 1: bad, 2: normal, and 3: good, and an average point was calculated.

TABLE 3

| | Quality of peach fruits | | |
|---|---|---|---|
| Evaluated item | Fruit bags of the invention | Fruit bags of comp. example | Conventional fruit bags |
| | Size in cm (height-length-width) | | |
| Upper branch | 7.06-7.51-8.42 | 7.05-7.60-8.30 | 7.05-7.63-8.28 |
| Middle branch | 6.96-7.56-7.91 | 6.71-7.12-7.71 | 6.67-7.10-7.63 |
| Lower branch | 6.61-7.15-7.40 | 6.42-6.81-7.01 | 6.36-6.72-7.16 |
| | Weight in g (average) | | |
| Upper branch | 272 | 264 | 260 |
| Middle branch | 244 | 232 | 204 |
| Lower branch | 220 | 184 | 178 |
| | Sugar content in % (average) | | |
| Upper branch | 15.0 | 14.4 | 14.3 |
| Middle branch | 13.5 | 12.7 | 12.5 |
| Lower branch | 12.2 | 12.1 | 13.6 |
| | Color (average point) | | |
| Upper branch | 2.75 | 2.60 | 3.00 |
| Middle branch | 2.80 | 2.75 | 2.00 |
| Lower branch | 2.17 | 1.76 | 1.60 |

TEST EXAMPLE 3

A raw material suitable for nylon fiber spinning was prepared by uniformly mixing the far-infrared radiating material C of the present invention in nylon in a formulation of 1 wt. % of the material C with respect to the nylon resin solids content. A nylon staple of 4 denier was produced by spinning of the raw material. Wool yarn was made in 20% blend of the nylon staple to wool, and a sweater was knit therefrom.

Another nylon staple containing 1 wt. % of the far-infrared radiating material M of the comparative example was produced in the same manner as above, and a similar sweater was knit from wool yarn in 20% blend of the nylon staple of the comparative example.

For further comparison, an additional sweater was prepared of 100% wool.

A man wore each of these sweaters in a room at a temperature of 20 ° C., and took off the sweater 30 minutes later. Soon after the undressing, a skin temperature measurement was conducted by thermography on the front surface of body, and measured values were compared with each other.

Table 4 shows the measurement results, from which it is seen that the clothing using the far-infrared radiating material of the present invention has excellent effects in maintenance and increase of body temperature.

TABLE 4

| | Measured values of skin temperature (°C.) | | |
|---|---|---|---|
| Measured portion | Sweater of the invention | Comparative example | Genuine wool |
| Head | 33.1 | 33.5 | 33.9 |
| Shoulder | 34.2 | 33.3 | 33.1 |
| Breast | 34.3 | 33.5 | 33.2 |
| Abdomen | 33.8 | 33.1 | 33.0 |

The far-infrared radiating material of the present invention can efficiently radiate far-infrared rays in wavelength range which are suitable to be absorbed by water contained in living organism such as animals, plants, and a human body, which can thus present excellent effects in applications, for example in processing such as drying and refrigeration of various materials, for example of food, in raising of agricultural and marine products, in addition of function, such as heat insulation, to medical instruments or to clothing, in air conditioning, or in hairdressing and cosmetic treatment.

What is claimed is:

1. A far-infrared radiating material comprising a combination of components comprising 5–60 wt. % of alumina, 20–70% of at least one titanium compound selected from titanium dioxide, titanium carbide and titanium boride, 20–50 wt. % of at least one zirconium compound selected from zirconia, zirconium carbide and zirconium boride, and 0.01–0.5 wt. % of a rare earth oxidel wherein said proportions of said components are sufficient to cause said material to radiate in the far infrared an amount sufficient to excite water molecules.

2. A far-infrared radiating material according to claim 1, wherein a sum of contents of the titanium compound and the zirconium compound is not less than 70 wt. %.

3. A far-infrared radiating material according to claim 1, wherein said rare earth oxide is lanthanum oxide, neodymium oxide, or yttrium oxide.

4. A far-infrared radiating material according to claim 1, wherein respective components are mited as powders.

5. A far-infrared radiating composition comprising a resin and a far-infrared radiating material as set forth in claim 1.

6. A far-infrared radiating composition according to claim 5, which is in the form of plate.

7. A far-infrared radiating composition according to claim 5, which is in the form of tube.

8. A far-infrared radiating composition according to claim 5, which is in the form of sheet.

9. A far-infrared radiating composition according to claim 5, which is in the form of fiber.

10. A far-infrared radiating material as claimed in claim 5 where said material consists essentially of said components in said proportions.

* * * * *